(12) United States Patent
Elhard (10) Patent No.: US 9,985,947 B1
(45) Date of Patent: May 29, 2018

(54) METHOD AND SYSTEM FOR COMMUNICATION OF DEVICES USING DYNAMIC ROUTES ENCODED IN SECURITY TOKENS AND A DYNAMIC OPTICAL LABEL

(71) Applicant: QuirkLogic, Inc., Calgary (CA)

(72) Inventor: Dean Elhard, Calgary (CA)

(73) Assignee: QuirkLogic, Inc., Calgary (CA)

( * ) Notice: Subject to any disclaimer, the term of this patent is extended or adjusted under 35 U.S.C. 154(b) by 220 days.

(21) Appl. No.: 14/986,270

(22) Filed: Dec. 31, 2015

(51) Int. Cl.
*H04L 29/06* (2006.01)
*H04L 29/08* (2006.01)

(52) U.S. Cl.
CPC ............ *H04L 63/08* (2013.01); *H04L 67/141* (2013.01)

(58) Field of Classification Search
None
See application file for complete search history.

(56) References Cited

U.S. PATENT DOCUMENTS

| | | | | |
|---|---|---|---|---|
| 8,631,097 B1* | 1/2014 | Seo | ................... | G06F 17/30905 709/203 |
| 9,668,085 B2* | 5/2017 | Pi-Sunyer | ........... | H04L 12/2816 |
| 9,679,072 B2* | 6/2017 | Boudville | ......... | G06F 17/30879 |
| 9,679,332 B2* | 6/2017 | Kim | .................... | G06Q 30/0643 |
| 9,747,388 B2* | 8/2017 | Micucci | .................. | H04L 63/08 |
| 9,838,830 B2* | 12/2017 | Lyons | ................... | H04W 4/008 |
| 2009/0132813 A1* | 5/2009 | Schibuk | ............... | G06Q 20/223 713/158 |
| 2010/0278453 A1* | 11/2010 | King | ...................... | G06Q 10/10 382/321 |
| 2011/0225417 A1* | 9/2011 | Maharajh | ................ | G06F 21/10 713/150 |
| 2011/0239270 A1* | 9/2011 | Sovio | ................... | G06F 21/6236 726/1 |
| 2012/0079582 A1* | 3/2012 | Brown | ................ | H04L 63/0807 726/7 |

(Continued)

OTHER PUBLICATIONS

Li, Victor O.K.; Zhang, Zaichen. Internet Multicast Routing and Transport Control Protocols. Proceedings of the IEEE, vol. 90, Issue: 3. Pub. Date: 2002. http://ieeexplore.ieee.org/stamp/stamp.jsp?tp=&arnumber=993404.*

(Continued)

*Primary Examiner* — Jeremiah Avery
(74) *Attorney, Agent, or Firm* — Chamberlain, Hrdlicka, White, Williams & Aughtry (57) ABSTRACT

A method and system for facilitating the communication between two or more devices, using a primary device, a secondary device, a relay server, and/or a bridge server. The method includes receiving, by a primary device, a primary token encoded with information to generate a primary URL and a secondary token encoded with information to generate a secondary URL, generating the primary URL from the primary token and the secondary URL from the secondary token, generating an optical label comprising information used to generate the secondary URL, and displaying the optical label to the secondary device. The method further includes establishing, by the relay server, a communication channel between the primary and second devices after the primary device connects to the relay server using the primary URL and the secondary device connects to the replay server using the secondary URL.

22 Claims, 7 Drawing Sheets

(56) References Cited

U.S. PATENT DOCUMENTS

| | | | |
|---|---|---|---|
| 2013/0080641 A1* | 3/2013 | Lui | H04L 67/10 |
| | | | 709/226 |
| 2013/0254858 A1 | 9/2013 | Giardina et al. | |
| 2015/0373149 A1* | 12/2015 | Lyons | G05B 15/02 |
| | | | 709/203 |
| 2016/0087933 A1* | 3/2016 | Johnson | G06F 8/60 |
| | | | 709/245 |
| 2016/0092339 A1* | 3/2016 | Straub | G06F 9/44521 |
| | | | 717/124 |

OTHER PUBLICATIONS

Ghavimi, Fayezeh; Chen, Hsiao-Hwa. M2M Communications in 3GPP LTE/LTE-A Networks: Architectures, Service Requirements, Challenges, and Applications. IEEE Communications Surveys & Tutorials, vol. 17, Issue: 2. Pub. Date: 2014. http://ieeexplore.ieee.org/stamp/stamp.jsp?tp=&arnumber=6916986.*

Decina, Maurizio; Trecordi, Vittorio. Convergence of Telecommunications and Computing to Networking Models for Integrated Services and Applications. Proceedings of the IEEE, vol. 85, Issue: 12. Pub. Date: 1997. http://ieeexplore.ieee.org/stamp/stamp.jsp?tp=&arnumber=650174.*

* cited by examiner

METHOD AND SYSTEM FOR COMMUNICATION OF DEVICES USING DYNAMIC ROUTES ENCODED IN SECURITY TOKENS AND A DYNAMIC OPTICAL LABEL

BACKGROUND

Users often need to transfer data between devices that are in close proximity of one another. With the increasing prevalence and portability of electronic computing devices, it is commonly the case that these devices, while in close proximity, are not preconfigured to communicate with and transfer data between one another. The traditional approach to connecting devices in this situation usually requires both devices to connect to a central network or to establish a point-to-point connection of some kind, whether using a wired or wireless means. After the connection between the devices is established, a handshake or initiation or some kind is usually required to allow the devices to communicate. Furthermore, once the devices are able to communicate, additional authentication and validation is required if users want to securely transfer data between the devices.

In such scenarios, the devices must necessarily have compatible software or hardware to facilitate each step of the traditional approach, thereby perpetuating the need for pre-configuration of the devices using various means, such as Virtual Private Networks (VPNs) or Network Access Control (NAC) rules, which expose a network or device to additional security vulnerabilities. As such, the aforementioned traditional approach is not as scalable, efficient, or convenient as an approach that does not necessitate said pre-configuration and not as secure as an approach that does not require the user to give a user or device access to their internal network.

SUMMARY

In general, in one aspect of the invention, the invention relates to a system for facilitating communication between a primary device and a secondary device. The system comprises a primary device, comprising a processor and a user interface, wherein the primary device is configured to: generate a primary token comprising, at least in part, a primary URL and a secondary token comprising, at least in part, a secondary URL, generate, using the processor, an optical label comprising information used to generate the secondary URL, display the optical label on the user interface, receive, from a secondary device in optical communication with the primary device, a connection request via the secondary URL, wherein the secondary device obtains the secondary URL by reading the optical label from the user interface of the primary device, and pair, in response to the connection request, the primary and secondary URLs to establish a communication channel between the primary and the secondary devices, wherein the communication channel facilitates communication between the primary device and the secondary device.

In general, in one aspect of the invention, the invention relates to a method for facilitating communication between a primary device and a secondary device. The method includes receiving a primary token encoded with information to generate a primary URL and a secondary token encoded with information to generate a secondary URL, generating the primary URL from the primary token and the secondary URL from the secondary token, generating an optical label comprising information used to generate the secondary URL, displaying the optical label to the secondary device, wherein the secondary device is in optical communication with the primary device, and connecting to a communication channel established by the relay server, in order to communicate with the secondary device.

In general, in one aspect of the invention, the invention relates to a system for facilitating communication between a primary device and a secondary device. The system comprises a primary device comprising a processor and a user interface, wherein the primary device is configured to receive a primary token encoded with information to generate a primary URL and a secondary token encoded with information to generate a secondary URL, generate, using the processor, the primary and secondary URLs, and generate and display, on the user interface, an optical label containing information used to generate the secondary URL, and a relay server operatively connected to the primary device and configured to generate the primary and secondary tokens, receive, from a secondary device in optical communication with the primary device, a connection request via the secondary URL, wherein the secondary device obtains the secondary URL by reading the optical label from the user interface of the primary device, and pair, in response to the connection request, the primary and secondary URLs to establish a communication channel between the primary and the secondary device, wherein the communication channel facilitates communication between the primary device and the secondary device.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for facilitating communication between at least two devices. More specifically, embodiments of the invention provide tokens encoded with URL information and utilize an optical label to convey information needed to establish an authenticated communication channel for communication between a primary device and at least one secondary device, which are not on the same network.

In one or more embodiments of the invention, the system includes at least one primary device that is in optical communication with a secondary device. Additionally, aside from the aforementioned optical communication, the at least one secondary device is not pre-authenticated or pre-configured to directly communicate back and forth with the primary device, and vice versa. Rather, the primary device and the one or more secondary devices communicate through an authenticated communication channel, that may be facilitated by a relay server, utilizing a primary token and a secondary token. Because embodiments of the invention utilize the authenticated communication channel, embodiments of the invention enable authenticated communication between the primary device and the one or more secondary devices, without the need for pre-authentication or pre-configuration.

Figure 1A:
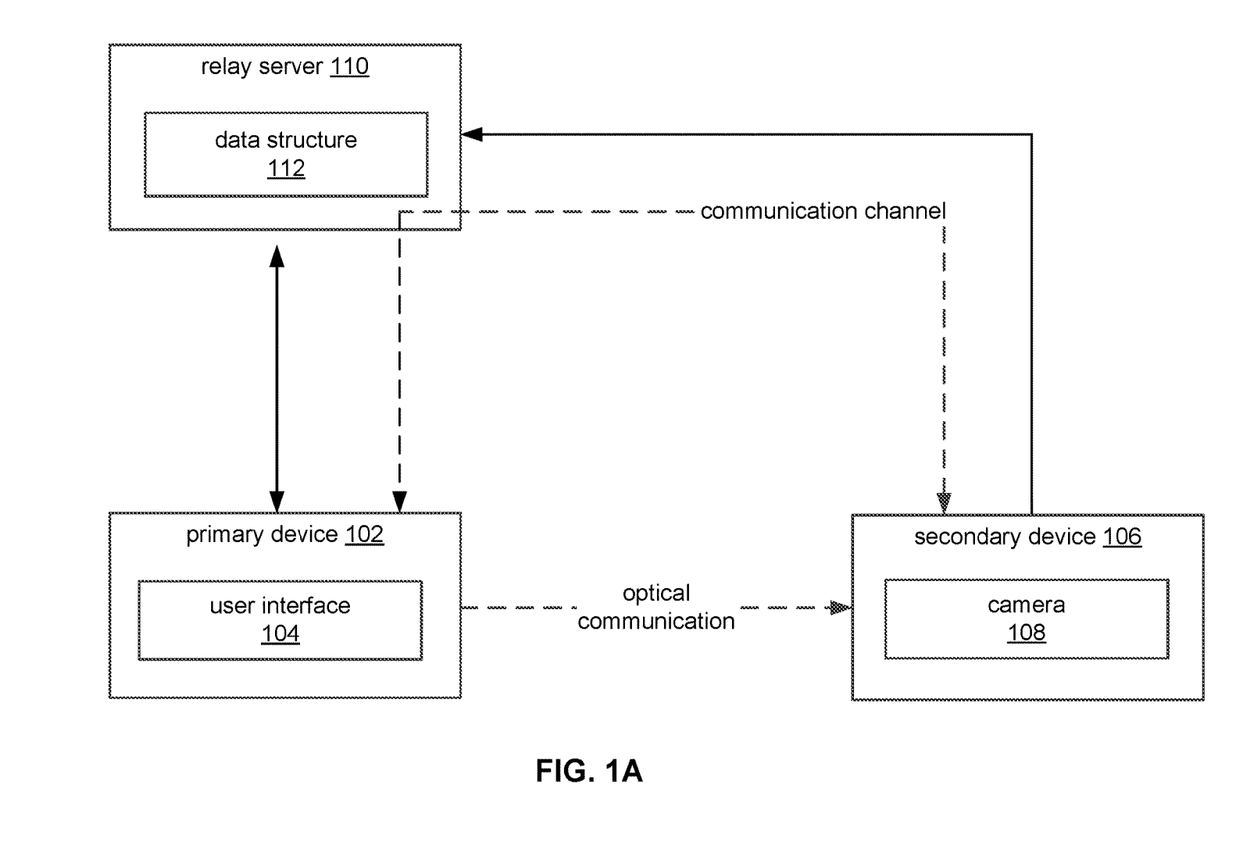
FIGS. 1A-1C show a system in accordance with one or more embodiments of the invention.
Figure 1B:
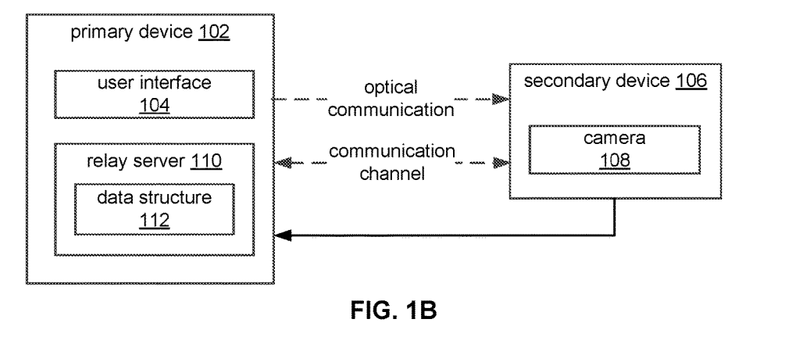
Figure 1C:
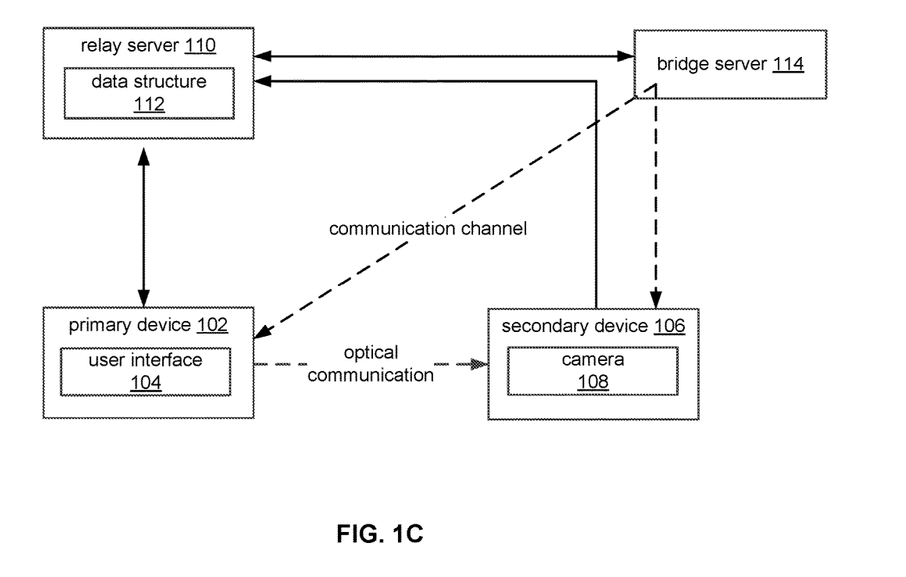

FIGS. 1A-1C shows systems in accordance with one or more embodiments of the invention. Each system is described below within the context of one or more embodiments, as shown in FIGS. 1A-1C.

FIG. 1A shows a system that includes a primary device (102), a secondary device (106), and a relay server (110). Each of the aforementioned components is described below.

In one or more embodiments of the invention, the primary device (102) is any physical system comprising a user interface (104) and a processor (not shown). The primary device may also comprise memory (not shown) and persistent storage (not shown). For example, the primary device (102) may be a desktop computer, a laptop, a smartphone, a tablet, an electronic presentation device, or any other similar computing system. The user interface (104), processor, memory and/or persistent storage, may be physically integrated components within the primary device (102). Alternatively, they may be stand-alone from, and operatively connected to, the primary device (102), using a wired or wireless medium. For example, the user interface (104), processor, memory and/or persistent storage, may be operatively connected to the primary device (102) using a USB cable, a network cable, a Bluetooth connection, a Wi-Fi connection, or any other suitable means of connection that allows these components to function in accordance with one or more embodiments of the invention. Additionally, in one or more embodiments of the invention, the primary device includes functionality to optically communicate with a secondary device (106) via the user interface and generate security token requests, process security tokens, and generate optical labels, using the processor, in accordance with the embodiments shown in FIG. 4.

The secondary device (106) may be any physical system that comprises a camera (108), as well as a processor (not shown) and a user interface (not shown), both of which are different from the processor (not shown) and user interface (104) of the primary device (102). For example, the secondary device (108) may be a desktop computer, a laptop, a smartphone, a tablet, a wearable device, an electronic presentation device such as an e-flipchart apparatus or an interactive whiteboard, or any other similar computing system. Furthermore, the camera (108), processor, and user interface of the secondary device may be components that are either physically integrated within, or stand-alone from and operatively connected to, the secondary device (106), in a similar manner as the primary device components described in the above. Additionally, in one or more embodiments of the invention, the secondary device (106) includes functionality to process optical labels and generate URLs, using its processor, in accordance with the embodiments shown in FIG. 4. As described above, the secondary device (106) is in optical communication with the primary device (102) and includes functionality to capture, using the camera (108), the optical labels generated by and displayed on the user interface of the primary device (102), in accordance with the embodiments shown in FIG. 4 and FIG. 6.

Those skilled in the art will appreciate that the system of FIG. 1A may include multiple secondary devices, each of which may be in optical communication with the primary device, without departing from the scope of the invention. The state of being in optical communication, as defined herein, means that the primary and secondary devices are in a requisite geographical proximity—a proximity close enough for the primary device to visually relay information to one or more secondary devices and for the one or more secondary devices to visually capture and process said information from the primary device. For example, in accordance with one or more embodiments of the invention, a primary device that is a desktop computer comprising a Liquid Crystal Display (LCD) may be located in a room with multiple secondary devices. The primary device may display an optical label comprising a barcode, on the LCD screen. A first group of multiple secondary devices located in the room, such as a group consisting of one tablet and two smartphones, may be close enough in proximity to the LCD that they are able to visually capture and process the optical label. In contrast, a second group of multiple secondary devices, which may be located in the room or otherwise, may not be close enough in proximity to the LCD screen to visually capture and process the optical label. The first group of secondary devices are said to be in optical communication with the primary device, whereas the second group of secondary devices is not.

Continuing with FIG. 1A, in one or more embodiments of the invention, the relay server (110) is any computing system that has a data structure (112), a processor (not shown), and server functionality. For example, the relay server may be a virtual server or a physical server appliance. Additionally, the processor of the relay server is different from, at least, the processor of the secondary device, although in one or more embodiments of the invention, such as the configuration shown in FIG. 1B, the processor of the relay server may be the same as the processor of the primary device. In one or more embodiments of the invention, the relay server includes functionality, via the processor, to receive a security token request from the primary device (102), generate a primary and a secondary security token, send the primary and secondary tokens to the primary device, and establish and manage a communication channel between the primary device (102) and the secondary device (106), in accordance with the embodiments shown in FIGS. 3-5. Furthermore, in one or more embodiments of the invention, the data structure (112) of the relay server (110) is configured to facilitate the establishment and management of the communication channel using information such as a primary token, a secondary token, a primary URL, a secondary URL, the primary device, the secondary device and a connection status, in accordance with the embodiments shown in FIG. 2.

FIG. 1B shows a system that includes the primary device (102) and the secondary device (106). Each of the aforementioned components is described below.

In one or more embodiments of the invention, the primary device (102) and secondary device (106) are configured as described above and shown in FIG. 1A. Additionally, the primary device (102) is further configured with the components and functionality of the relay server (110) described above and shown in FIG. 1A. Said another way, the primary device in FIG. 1B is configured to function as both the primary device (102) and the relay server (11). Accordingly, in one or more embodiments of the invention, the primary device (102) may comprise a data structure (112) configured to store information related to the communication channel, as previously described, and include functionality, via the processor of the primary device, to receive a security token request, generate a primary and a secondary security token, and use the primary and secondary tokens to establish and manage a communication channel to the secondary device (106), in accordance with the embodiments shown in FIGS. 3-5.

FIG. 1C shows a system that includes a primary device (102), a secondary device (106), a relay server (108), and a bridge server (114). Each of the aforementioned components is described below.

In one or more embodiments of the invention, the primary device (102) and the secondary device (106) are configured as described above and shown in FIG. 1A. The relay server (108) is also configured as described above and shown in FIG. 1A, except that the relay server may not include functionality to establish a communication channel between the primary device and the at least one secondary device. In one or more embodiments of the invention, the relay server may be used solely to receive requests for, and generate, security tokens, and to store and track the connection information related to the communication channel, while the bridge server may be used solely for establishing and maintaining the communication channel. In one or more embodiments of the invention, where the bridge server establishes the communication channel, the relay server may authenticate and transfer the communication channel information used in the data structure, to the bridge server.

In one or more embodiments of the invention, the bridge server (114) is any computing system comprising a processor (not shown), and operatively connected to the relay server (110) in a manner that allows communication with the relay server (110). For example, the bridge server may be a virtual server or a physical server appliance. Additionally, the processor of the bridge server is different from the processors of the primary device and the relay server, as well as the processor(s) of any secondary device(s). Furthermore, the bridge server (114) is configured with functionality to establish a communication channel, connecting the at least one secondary device (106) with the primary device (102), in accordance with Step 424 of FIG. 4.

System configurations other than those shown in FIGS. 1A-1C may be used without departing from the scope of the invention. For example, various components may be combined to create a single component, as illustrated in FIG. 1B. As another example, the functionality performed by a single component may be performed by two or more components, as illustrated in FIG. 1C.

Figure 2:
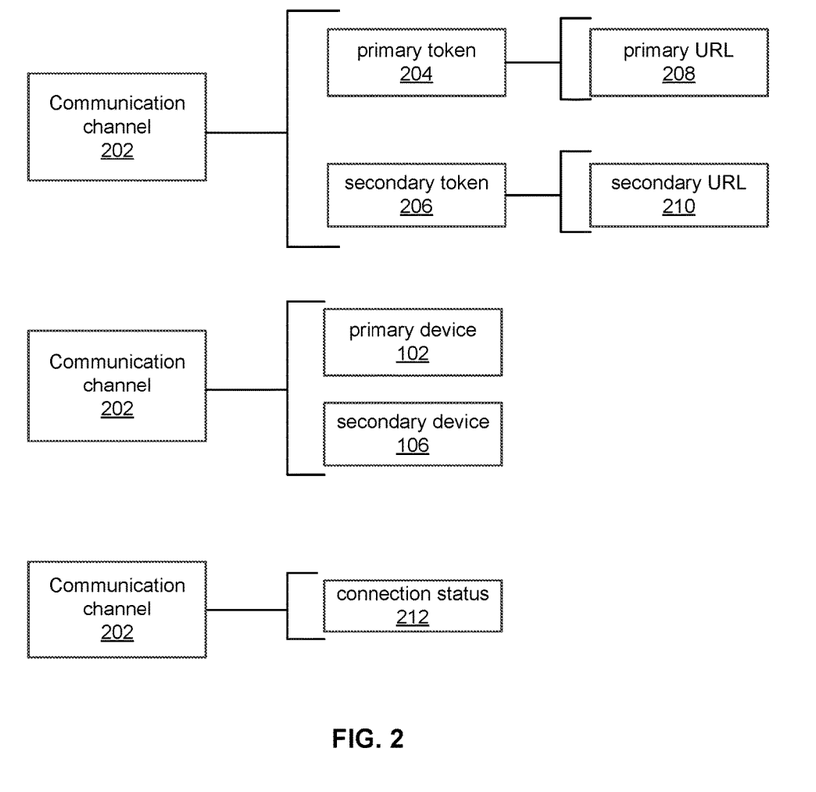
FIG. 2 shows a data structure in accordance with one or more embodiments of the invention.

FIG. 2 shows a data structure (112) configured to facilitate the establishment, authentication, and management of a communication channel (202), and relationships between components utilized by the communication channel. In one or more embodiments of the invention, the communication channel in the data structure comprises a token mapping, a URL association, a primary device, a secondary device, and a connection status. The token mapping comprises a primary token (204) and a secondary token (206) that correlates with the primary token, as generated by the relay server (110), in accordance with FIG. 3. The URL association comprises a primary URL (208) and a secondary URL (210), each of which are respectively derived from the primary and secondary tokens, in accordance with FIG. 3, and associated with one another based on the token mapping. The primary device (102) and the secondary device (106) are operatively connected through the communication channel, in a manner that allows the said devices to communicate, using the token and URL mappings in the data structure. A connection status (212) is tracked, based on the state of the connection of the primary and secondary devices through the communication channel, in order to manage the connection of the communication channel upon its establishment. For example, a connection status may be active, idle, temporarily disconnected, permanently disconnected, etc. Based on the connection status, the relay server may take certain actions, such as re-establishing the communication channel if it is temporarily disconnected due to an internet connection problem or sending a message to the primary and/or secondary devices connected to the communication channel, if the connection status is idle for a certain period of time.

Figure 3:
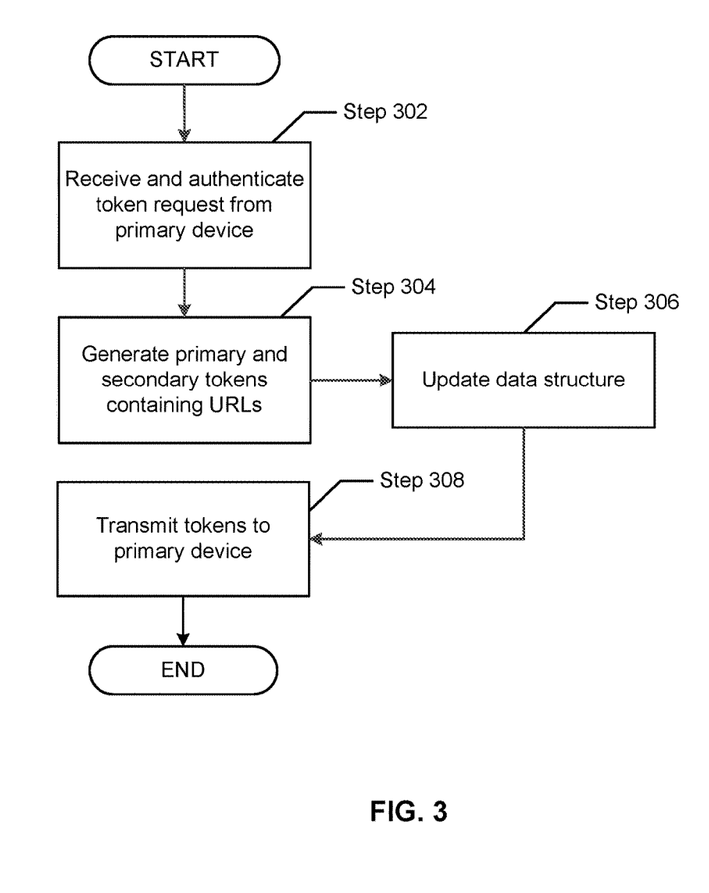
FIG. 3 shows a flowchart for transmitting tokens in accordance with one or more embodiments of the invention.
Figure 4:
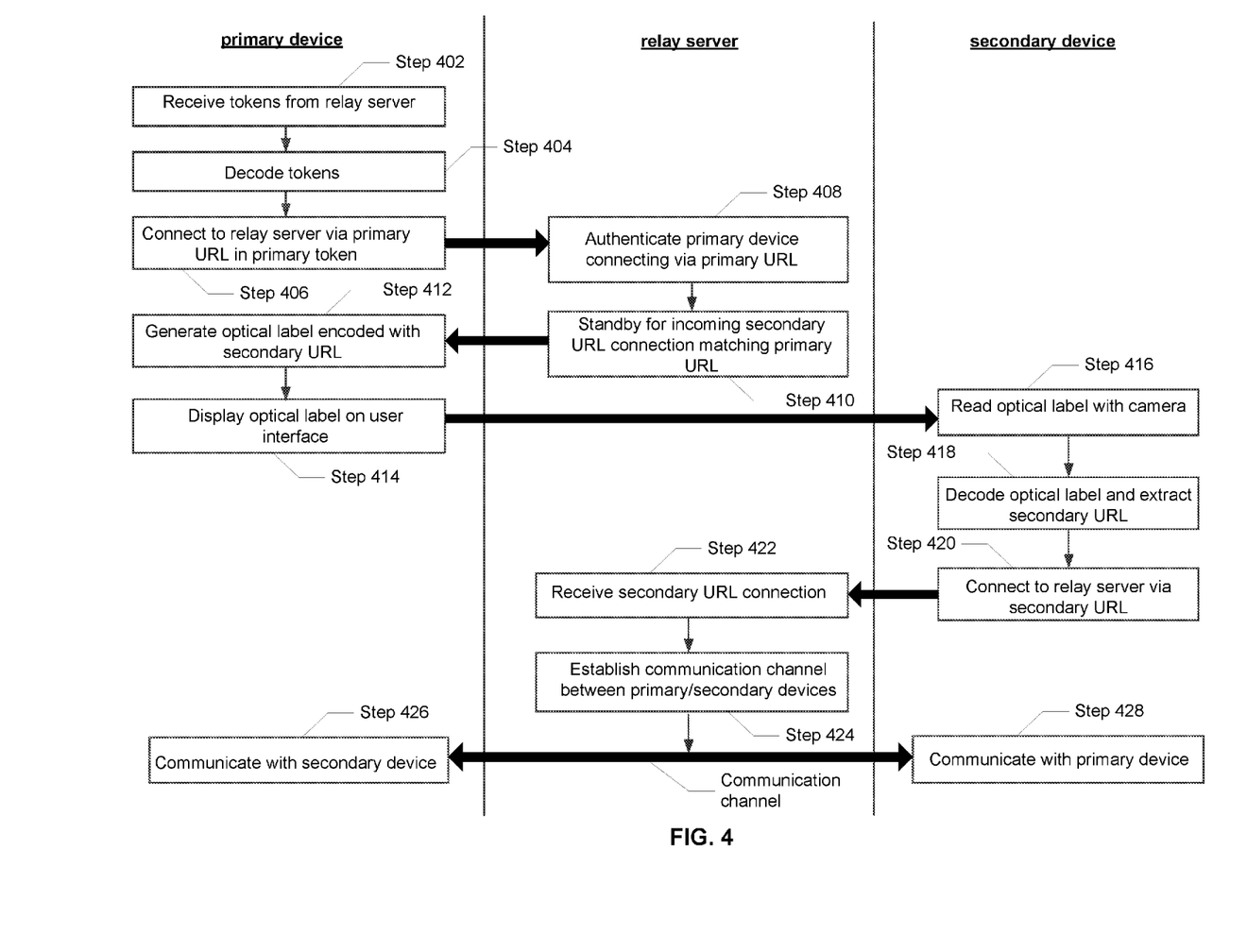
FIG. 4 shows a flowchart for establishing a communication channel in accordance with one or more embodiments of the invention.
Figure 5:
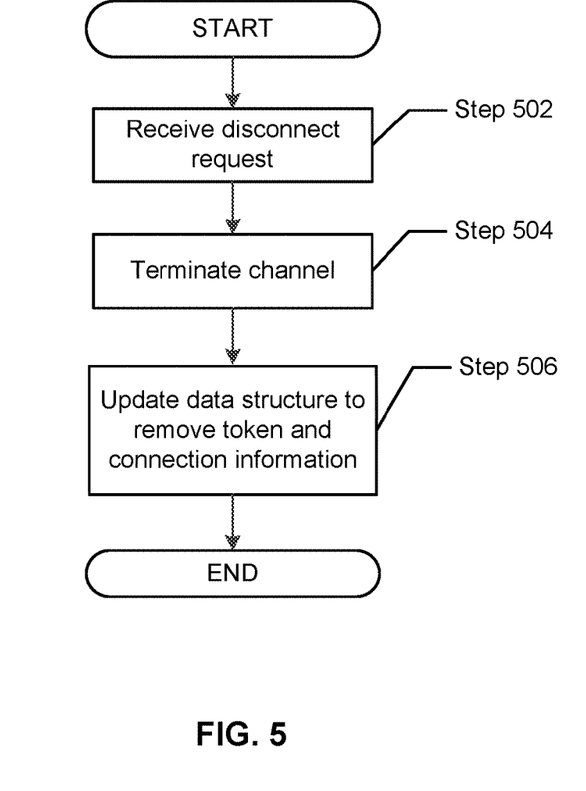
FIG. 5 shows a flowchart for terminating a communication channel in accordance with one or more embodiments of the invention.

FIGS. 3-5 show flowcharts in accordance with one or more embodiments of the invention. While the various steps in each flowchart are presented and described sequentially, one of ordinary skill in the art will appreciate that some or all of the steps may be executed in different orders, may be combined or omitted, and/or may be executed in parallel. In one embodiment of the invention, one or more steps shown in FIGS. 3-5 may be performed in parallel with one or more other steps shown in FIGS. 3-5.

FIG. 3 shows a flowchart for processing a token request in accordance with one or more embodiments of the invention. The process shown in FIG. 3 is performed from the perspective of the relay server in the system. In step 302, the relay server receives and authenticates a token request made by the primary device. The relay server may directly and/or indirectly authenticate the token request using one or more means. For example, the token request may be indirectly authenticated through an intermediary device such as a firewall, based on the authentication of the primary device's IP address. As another example, the token request may be directly authenticated by the relay server, based on the verification of certain identifying information contained within the body of the token request.

In step 304, the relay server generates the primary and secondary token, upon authentication of the token request. The primary token is encoded with information used to generate the primary URL and the secondary token is encoded with information used to generate the secondary URL. The information encoded within the primary and secondary tokens may include respective primary and secondary URL paths in their entirety. Alternatively, the information encoded within the primary and secondary tokens may comprise only a portion of the respective primary and secondary URL paths. For example, a valid primary URL may be structured as follows: baseURL\primarydeviceID\primarytokennumber. Instead of encoding the entire baseURL\primarydeviceID\primarytokennumber path within the primary token, the relay server may only encode the primarytokennumber portion of the primary URL. As an additional security measure, the remaining information needed to generate the primary URL may have been provided to an authorized user of the primary device at an earlier point in time. Further to the example above, a valid secondary URL may be structured as follows: baseURL\primarydeviceID\secondarytokennumber. Based on this structure, the information in the secondary token may only include the secondarytokennumber portion of the secondary URL, as the additional information should already be known by the primary device and can be conveyed to the secondary device using, for example, the optical label.

The primary and secondary tokens are linked through a one-to-one mapping, forming a unique token pair in accordance with FIG. 2. Those skilled in the art, having benefit of this disclosure, will appreciate that each primary token corresponds with only one secondary token, and vice versa. Additionally, one primary device may communicate with multiple secondary devices through multiple unique communication channels, established using the unique primary and secondary URLs issued for each one-to-one primary and secondary token pair.

In step 306, the data structure is updated with the token information from step 304. The information updated to the data structure is information used to facilitate the establishment of the communication channel, in accordance with one or more embodiments of FIG. 2. This includes information related to each unique communication channel, such as the primary and secondary token pairs and the corresponding primary and secondary URL pairs, as well as the associated primary and secondary devices and the connection status of the communication channel between those devices. In step 308, the tokens are transmitted to the primary device to be decoded, in order for the primary device to extract the pertinent token and URL information encoded within the tokens. In one or more embodiments where the primary device also functions as the relay server, as shown in the configuration in FIG. 1B, a relay server process of the primary device transmits the tokens to one or more different processes of the primary device, so that the one or more different processes may decode and extract the tokens, in accordance with the embodiments in FIG. 4.

FIG. 4 shows a flowchart illustrating the main process and the interaction between system components during various steps of the main process, in accordance with one or more embodiments of the invention. As previously mentioned, the functionality of the relay server may be executed within the primary device, or within a component that is physically separate from the primary device.

In step 402, the primary device receives the primary and secondary tokens from the relay server, via either the relay server process of the primary device or the relay server that is a separate physical component from the primary device. In step 404, upon obtaining the primary and secondary tokens, the primary device decodes and processes the tokens. The primary device decodes the primary token to obtain information such as the primary URL information. The primary device decodes the secondary device to obtain information such as the secondary device URL information. The primary device may also extract token authentication information from the primary and/or secondary token, to be used by the primary and/or secondary device as a means of authenticating to the relay server, upon initiation of a connection request via the primary and/or secondary URL. In step 406, the primary device uses the information decoded from the primary token to generate the primary URL, used to connect to the relay server. The primary device then initiates a connection to the relay server, via the generated primary URL.

In step 408, the relay server authenticates the primary device connecting via the primary URL. The primary device may be authenticated by one or more means, including, but not limited to: pre-configuring device-specific access permissions within the relay server (e.g. a local access control list), pre-configuring device-specific access permissions through a common intermediary device (e.g. via a Mac-address access control list on a router), preconfiguring network-specific access permissions through a common intermediary device (e.g. via an IP-based policy on a firewall); and/or dynamic verification of the primary token upon receipt of a connection request (e.g. via static, synchronous dynamic, asynchronous or challenge-response password implementations). In step 410, the relay server stands by for an incoming connection request from the secondary device, in accordance with one or more embodiments of the invention. The relay server uses the mapping in the data structure to match the secondary URL with the corresponding primary URL, upon receipt of the connection request from the secondary device, in accordance with FIG. 2. In one or more embodiments, the secondary device may connect to the relay server before the primary device. There is no particular order in which the URL connections must be made, as further discussed below in step 424.

In step 412, the primary device generates an optical label encoded with the secondary URL, using the information obtained from the secondary token in step 404. In step 414, the primary device visually displays the optical label on its user interface, in order for the secondary device to capture and process the optical label. In step 416, the secondary device reads, or in other words, captures, the optical label with the camera, so that it may be processed by the secondary device. As previously discussed, in accordance with one or more embodiments shown in FIGS. 1A-1C, the secondary device must be in optical communication with the primary device, in order to capture and process the optical label. In step 418, the secondary device decodes the optical label to extract information such as secondary URL information. Additionally, as alluded to in step 404, the secondary device may also extract token authentication information to be used as a means of authenticating to the relay server, upon initiation of its connection request via the secondary URL. In step 420, the secondary device initiates a connection request to connect to the relay server using the secondary URL.

In one embodiment of the invention, the secondary URL may not be tied to a specific secondary device; rather, the secondary URL may be used by any secondary device. Accordingly, once the optical label is displayed in step 414, any secondary device may perform steps 416-420. In such embodiments, if two secondary devices attempt to perform steps 416-420, the secondary device that performs step 420 first (i.e., is able to successful connect to the relay server via the secondary URL) is able to establish a communication channel with the primary device while the other secondary devices (which may have performed steps 416 and 418) are unable to connect the relay server using the secondary URL. In this manner, each secondary URL may only be used by a single secondary device to establish a communication channel with the primary device. Said another way, two secondary devices may not use the same secondary URL to individually establish a communication channel with the primary device.

Continuing with the discussion of FIG. 4, in step 422, the relay server receives the connection request of the secondary device via the secondary URL and establishes the connection with the secondary device. In one or more embodiments of the invention, the relay server may authenticate the connection request, upon receipt of said request and before establishing a connection with the secondary device, using one or more means, such as verification of the primary information extracted by the secondary device (e.g. via static, synchronous dynamic, asynchronous or challenge-response password implementations).

In step 424, the relay server establishes the communication channel between the primary and secondary devices. As stated above with respect to step 410, there is no particular order in which the relay server must connect to the primary and secondary devices. As shown in FIG. 2, the relay server maps the primary and secondary tokens with one another on a one-to-one basis. Furthermore, the primary URL and the secondary URL, encoded, at least in part, within the primary token and the secondary token, respectively, are associated with one another based on the one-to-one token mapping. After making mapping the tokens and associating the URLs, the relay server updates the data structure before going on to issue the tokens to the primary device. Accordingly, the relay server has the necessary information to establish the communication channel, upon connecting to both the primary and secondary devices, without regard to the order in which the relay server connects to said devices.

As a result of step 424, the relay server establishes the communication channel between the primary and secondary devices, allowing the primary device to communicate with the secondary device, as shown in step 426 and the secondary device to communicate with the primary device, as shown in step 428. In one or more embodiments of the invention, the communication channel may flow through a relay server device that is physically separate from the primary device, as previously discussed and shown in FIG. 1A. In this case, the relay server device may serve as an intermediary of the bi-directional connection. Alternatively, in one or more embodiments of the invention, the communication channel may be established directly between the primary and secondary devices, utilizing the relay server process of the primary device, as previously discussed and shown in FIG. 1B. As another alternative, in one or more embodiments of the invention, the bridge server may serve as an intermediary of the communication channel, utilizing the connection information received from the relay server, as previously discussed and shown in FIG. 1C.

FIG. 5 shows a flowchart illustrating the process for disconnecting the communication channel, in accordance with one or more embodiments of the invention. In step 502, the relay server receives a disconnect request. The disconnect request may be initiated in multiple ways. For example, the disconnect request may be initiated as a result of either the primary or secondary device losing Internet connection to the relay server. As another example, the disconnect request may be automatically initiated by the relay server after the lapse of a certain pre-determined period of time, or after a certain pre-determined period of inactivity.

In step 504, the relay server terminates the communication channel, in response to the disconnect request. Depending on the circumstances, the relay server may classify the disconnect request as temporary or permanent. For example, the communication channel may be temporarily disconnected due to a brief intermittent network disruption, such as network latency, which causes either the primary or secondary device to lose connection to the relay server. Under these circumstances, the relay server may classify the brief disconnection resulting from the network latency, as a temporary disconnect request. Alternatively, as another example, the relay server may classify a disconnect request initiated and confirmed directly from the user interface of the primary or secondary device, as a permanent disconnect request.

Once the communication channel is terminated, the connection status tracked in the data structure may be updated to reflect that the communication channel has been disconnected. If the termination results from a temporary disconnect request, the communication channel may be reestablished once both the primary and secondary device are timely reconnected to the relay server via their respective primary and secondary URLs. However, upon receiving a permanent disconnection request, the data structure may be updated to remove the primary and secondary tokens associated with the communication channel, thereby also invalidating the primary and secondary URLs used to establish the communication channel. In step 506, the relay server updates the data structure, removing the token and URL information related to the disconnected communication channel. Those skilled in the art, having benefit of this disclosure, will appreciate that once the relay server removes the token and URL information from the data structure, neither the primary and secondary tokens, nor the primary and secondary URLs, may be reused, whether by the same or different primary and/or secondary devices. Instead, the primary device must initiate a new token request to the relay server, in order to re-authenticate and receive new primary and secondary tokens, respectively encoded with new primary and secondary URLs.

Figure 6:
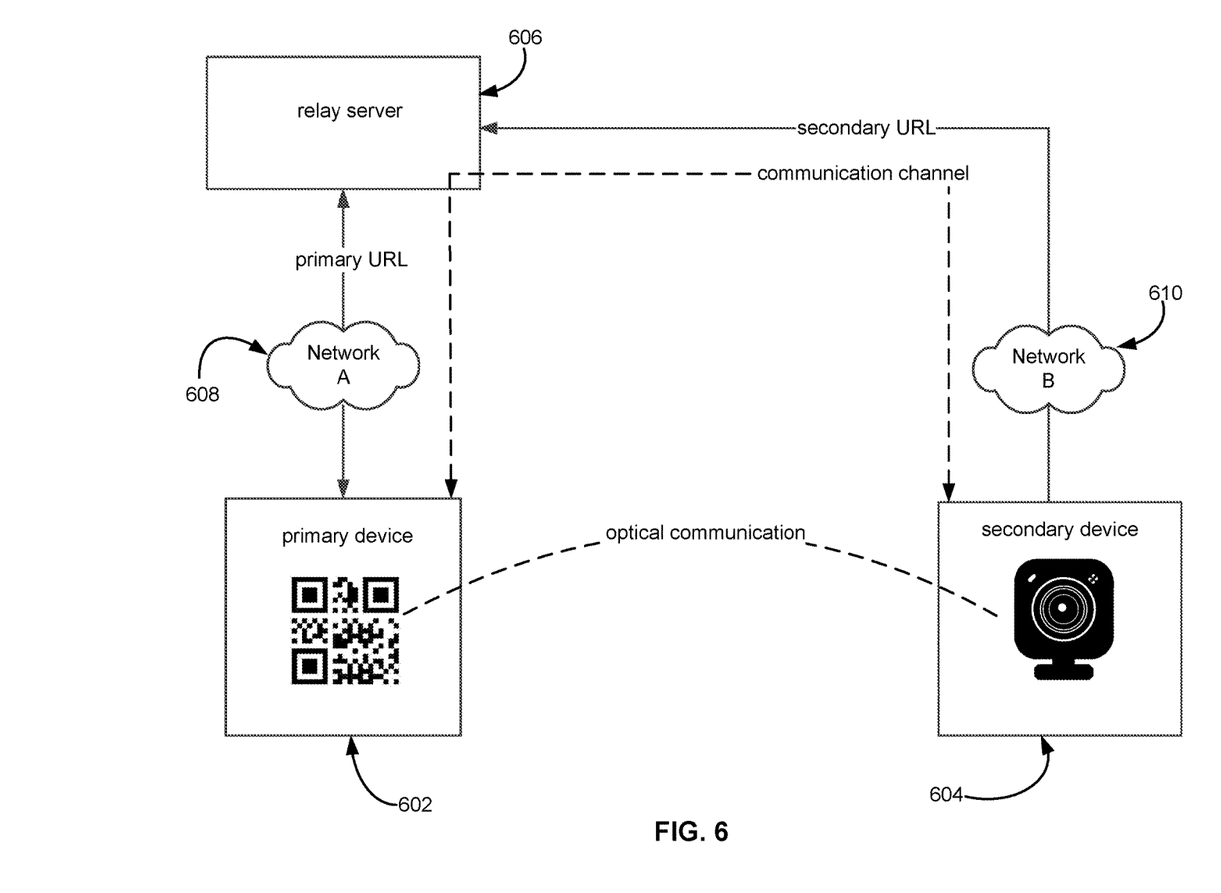
FIG. 6 shows an example of a system implementing one or more embodiments of the invention.

FIG. 6 shows an example in accordance with one or more embodiments of the invention. The example of FIG. 6 is for explanatory purposes only, and is not intended to limit the scope of the invention.

Consider a scenario in which there exists a first user sharing a presentation on a primary device that is an electronic flipchart apparatus, and a second user with a secondary device that is a personally-owned tablet. The users and devices are in the same conference room. The electronic flipchart is directly connected to a local area network (LAN) and the personally-owned tablet is connected to a network of the second user's wireless service provider. In such a scenario, the presentation may be shared by the users, and the first user may wish to receive information from the second user to share on the electronic flipchart, without having to directly authenticate through the second user's network, or vice versa.

In the scenario described and shown in FIG. 6, using embodiments described herein, the primary device and secondary device are able to communicate through a communication channel established by a relay server, without the need for pre-authentication or pre-configuration at the device or network level. To facilitate the generation of the communication channel, the primary device, which is pre-configured to communicate with a relay server on a common network, makes a token request to the relay server via the common network. The token request initiates the establishment of the communication channel.

Upon receipt and authentication of the token request, the relay server generates a primary token and a secondary token, each of which is encoded with information to generate a primary URL and secondary URL, respectively. The primary and secondary tokens are transmitted to the primary device over the common network. After obtaining the tokens, the primary device extracts the URL information from both tokens. The primary device uses the information extracted from the primary token to generate the primary URL. Additionally, the primary device uses the information extracted from the secondary token to generate an optical label encoded with information associated with the secondary URL. The primary device then displays the optical label on its user interface for the secondary device to capture. The secondary device captures the optical label with a camera, processes it, and extracts the information relating to the secondary URL to generate the secondary URL.

Continuing with the example scenario of FIG. 6, the primary device sends a connection request to the relay server through the primary URL. Similarly, the secondary device sends a connection request to the relay server through the secondary URL. After connecting with both the primary and secondary devices through the respective URLs, the relay server establishes the communication channel. Specifically, the relay server links the primary and secondary URLs to form a communication channel to facilitate the communication of the primary and secondary devices. Once the communication channel is established, the primary device and the secondary device are able to communicate. In one embodiment of the invention, the communication channel is a unidirectional communication channel (e.g., data may be transferred from the secondary device to the primary device or vice versa). In another embodiment of the invention, the communication channel is a bi-directional channel, in which both the primary device and the secondary device are able to send data to each other.

Embodiments of the invention may be implemented on a computing system. Any combination of mobile, desktop, server, embedded, or other types of hardware may be used. The computing system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. The computing system may also include one or more input device(s) such as a touchscreen, keyboard, mouse, microphone, touchpad, electronic pen, or any other type of input device. Further, the computing system may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system may be connected to a network (e.g., a local area network (LAN), a wide area network (WAN) such as the Internet, mobile network, or any other type of network) via a network interface connection (not shown). The input and output device(s) may be locally or remotely (e.g., via the network) connected to the computer processor(s), memory, and storage device(s). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a primary device, comprising a processor and a user interface, wherein the primary device is configured to:
   generate a primary token comprising, at least in part, a primary URL and a secondary token comprising, at least in part, a secondary URL;
   generate, using the processor, an optical label comprising information used to generate the secondary URL;
   visually relaying the information in the optical label to a secondary device by displaying the optical label on the user interface of the primary device;
   receive, from the secondary device in optical communication with the primary device, a connection request via the secondary URL, wherein the secondary device generates the secondary URL using information obtained by reading the optical label from the user interface of the primary device; and
   pair, in response to the connection request, the primary and secondary URLs to establish a communication channel between the primary device and the secondary device, wherein the communication channel facilitates communication between the primary device and the secondary device.

2. The system of claim 1, wherein the primary token is linked to the secondary token in a one-to-one mapping.

3. The system of claim 2, wherein the one-to-one mapping is used as a basis for establishing the communication channel between the primary device, and the secondary device.

4. The system of claim 1, wherein the secondary device comprises a camera configured to read the optical label from the user interface of the primary device, and wherein the secondary device is further configured to process the optical label and generate the secondary URL.

5. The system of claim 1, wherein the primary device is further configured to store a data structure comprising:
   a mapping of the primary and secondary tokens;
   an association between the primary and secondary URLs, wherein the association is based on the mapping of the primary and secondary tokens; and a connection status of the primary and secondary URLs, wherein the data structure is configured to track a status of the established communication channel.

6. The system of claim 1, wherein the primary token is encoded with information used to generate the primary URL, and wherein the secondary token is encoded with information used to generate the secondary URL.

7. The system of claim 1, wherein the primary and secondary devices are each one selected from the group consisting of a phone, a tablet, a laptop, a personal computer, and an electronic presentation device.

8. The system of claim 1, wherein the communication channel is a bi-directional communication channel.

9. A method for facilitating communication between a primary device and a secondary device, comprising:
   receiving a primary token encoded with information to generate a primary URL and a secondary token encoded with information to generate a secondary URL;
   generating the primary URL from the primary token and the secondary URL from the secondary token;
   generating an optical label comprising information used to generate the secondary URL;
   visually relaying the information in the optical label to the secondary device by displaying the optical label on a user interface of the primary device, wherein the secondary device is in optical communication with the primary device; and
   connecting to a communication channel established by a relay server, in order to communicate with the secondary device.

10. The method of claim 9, wherein the secondary device comprises a camera and is configured to:
   read the optical label from a user interface of the primary device;
   process the optical label to generate the secondary URL; and
   transmit a connection request via the secondary URL.

11. The method of claim 10, wherein the primary device receives the primary and secondary tokens from the relay server operatively connected to the primary device, wherein the relay server is configured to establish the communication channel by:
   receiving the connection request from the secondary device via the secondary URL; and
   pairing the primary URL and secondary URL to establish the communication channel.

12. The method of claim 11, wherein the secondary device connects to the relay server using the secondary URL.

13. The method of claim 11, further comprising:
   transmitting a token request requesting the primary and secondary tokens from the relay server.

14. The method of claim 13, wherein the relay server is further configured to authenticate the primary device upon receipt of the token request.

15. The method of claim 11, wherein the relay server is configured to store a data structure comprising:
   a mapping of the primary and secondary tokens;
   an association between the primary and secondary URLs; and
   a connection status of the primary and secondary URLs, wherein the data structure is configured to track a status of the established communication channel.

16. The method of claim 15, wherein the relay server is further configured to:
   receive from the primary device, a request to disconnect direct communication with the secondary device; and
   terminate the communication channel in response to the request to disconnect.

17. The method of claim 16, wherein the association between the primary and secondary URLs is removed from the data structure upon termination of the communication channel and wherein the status of the established communication channel is updated to reflect the termination.

18. A system, comprising:
   a primary device comprising a processor and a user interface, wherein the primary device is configured to:
      receive a primary token encoded with information to generate a primary URL and a secondary token encoded with information to generate a secondary URL;
      generate, using the processor, the primary and secondary URLs; and
      generate an optical label comprising information used to generate the secondary URL,
      visually relaying the information in the optical label to a secondary device by displaying the optical label on the user interface of the primary device; and
   a relay server operatively connected to the primary device and configured to:
      generate the primary and secondary tokens;
      receive, from the secondary device in optical communication with the primary device, a connection request using the secondary URL, wherein the secondary device generates the secondary URL using information obtained by reading the optical label from the user interface of the primary device; and
      pair, in response to the connection request, the primary and secondary URLs to establish a communication channel between the primary and the secondary device, wherein the communication channel facilitates communication between the primary device and the secondary device.

19. The system of claim 18, wherein the relay server is configured to store a data structure comprising:
   a mapping of the primary and secondary tokens;
   an association between the primary and secondary URLs, wherein the association is based on the mapping of the primary and secondary tokens; and
   a connection status of the primary and secondary URLs, wherein the data structure is configured to track a status of the established communication channel.

20. The system of claim 18, wherein the secondary device processes the optical label from the user interface of the primary device, generates the secondary URL, and connects to the relay server via the secondary URL.

21. The system of claim 18, wherein the relay server authenticates the primary device prior to sending the primary and secondary tokens to the primary device.

22. The system of claim 18, wherein the communication channel is a bi-directional communication channel.

* * * * *